United States Patent [19]
DeSousa et al.

[11] Patent Number: 4,918,768
[45] Date of Patent: Apr. 24, 1990

[54] AIR VALVE FOR SPAS AND BATHS

[75] Inventors: Daniel A. DeSousa, Clayton; William G. Badley, Antioch; Ralph D'Innocente, Pittsburg, all of Calif.

[73] Assignee: Jacuzzi Whirlpool Bath, Walnut Creek, Calif.

[21] Appl. No.: 122,051

[22] Filed: Nov. 18, 1987

[51] Int. Cl.$^5$ ............................................. A61H 33/02
[52] U.S. Cl. ...................................... 4/542; 251/310; 251/288; 251/209; 137/854
[58] Field of Search .................. 4/488, 492, 541, 542, 4/543, 544; 128/66; 137/614.2, 854; 251/310, 280, 209

[56] References Cited

U.S. PATENT DOCUMENTS

| | | | |
|---|---|---|---|
| 865,451 | 9/1967 | Swift | 251/310 |
| 1,043,935 | 11/1912 | Hitchcock | 251/209 |
| 2,723,102 | 11/1955 | Mueller | 251/209 |
| 3,409,270 | 11/1968 | Hulsey | 251/209 |
| 3,874,374 | 4/1975 | Jacuzzi | 128/66 |
| 4,262,880 | 4/1981 | Danko et al. | 251/209 |
| 4,592,100 | 6/1986 | Robertson et al. | 4/488 |

*Primary Examiner*—Linda J. Sholl
*Attorney, Agent, or Firm*—Limbach & Limbach & Sutton

[57] ABSTRACT

An air valve for controlling the supply of air to a venturi jet of a spa includes a housing, a cylindrical barrel, means for sealing between the housing and the barrel, and means for rotating the barrel. The housing has an interior chamber extending between an open, cylindrical bore at one end and a pipe coupling at the other end. The housing mounts on the inside wall of the spa, with the open end of the bore facing the inside of the spa and the rest of the housing extending through the side wall and positioned outside the spa. The cylindrical barrel is insertable into and rotatably mounted within the cylindrical bore of the housing. The housing and barrel each include ports that, when overlapping, provide a path for air to flow from a point exterior of the housing, through the overlapping ports, through the interior of the barrel and housing to the pipe coupling. Rotating the barrel to a position where the ports do not overlap blocks the air flow path. The sealing means prevents air from flowing through the valve except when the housing and barrel ports overlap.

15 Claims, 2 Drawing Sheets

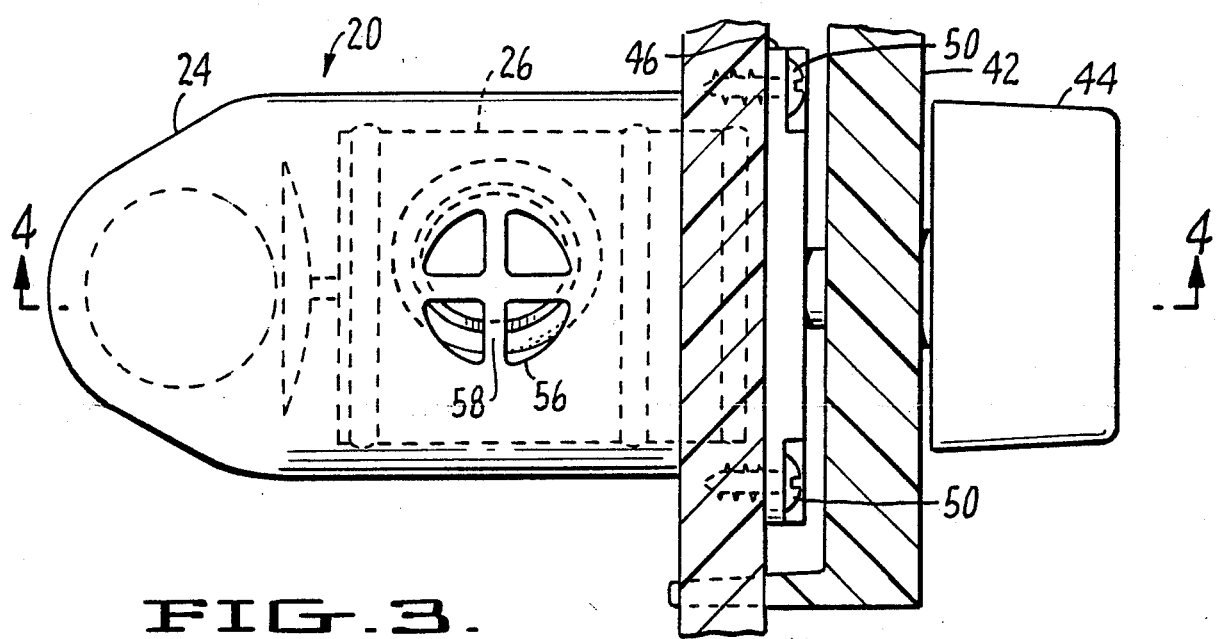
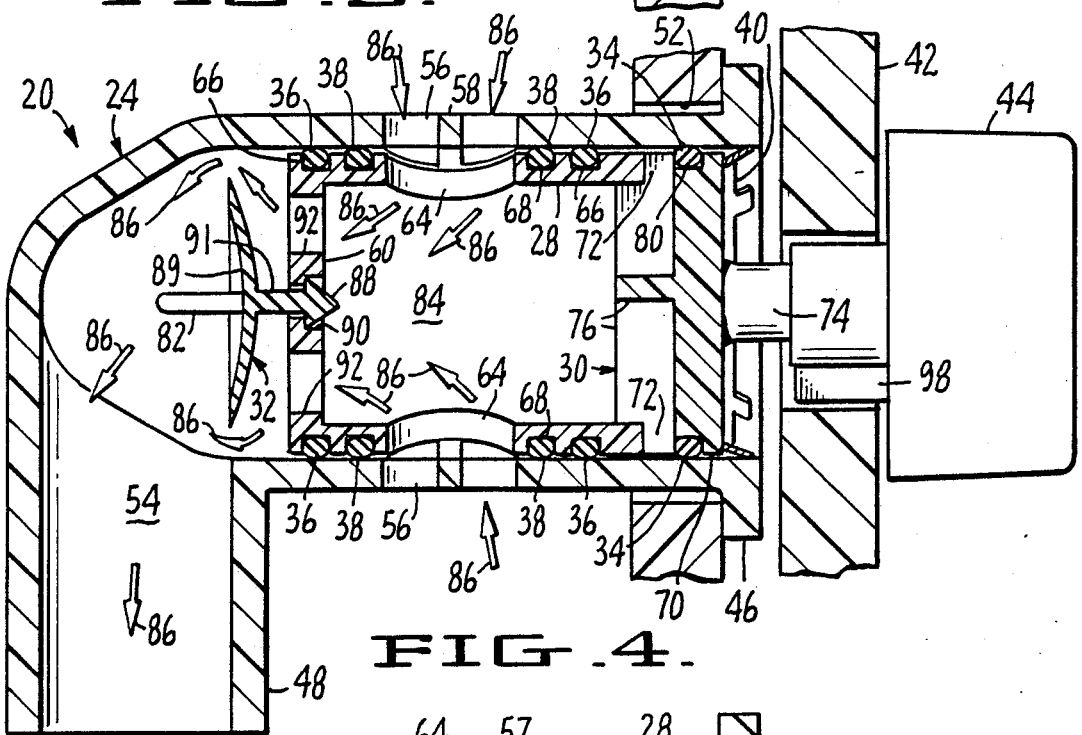
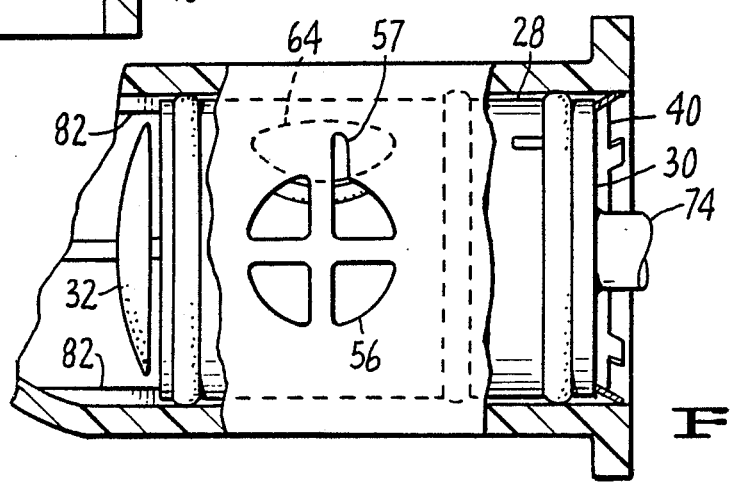

AIR VALVE FOR SPAS AND BATHS

BACKGROUND OF THE INVENTION

1. Field of the Invention

This invention relates generally to air induction systems for hydromassage equipment, and relates more particularly to an air valve for controlling the supply of air to an air induction jet.

2. Description of the Relevant Art

The hydromassage effect in a water-filled spa or bath is created by propelling a combination of air and water through a jet and into the spa. The spa or bath includes one or more jets through which water is pumped into the spa. Each jet includes a venturi region that creates a partial vacuum when water flows through it. An air valve controls the supply of air to the venturi, so that when the air valve is open, air is drawn through the valve and into the jet, where it mixes with the water flowing into the spa or bath.

Prior art air valves have typically been difficult to service due to the common practice of mounting the air valves on the outside wall of the spa or bath. Servicing an air valve located in such a position requires partial disassembly or removal of the spa in order to gain access to the air valve. Thus, a problem as simple as correcting a broken valve stem might require an inordinate amount of time for repair.

SUMMARY OF THE INVENTION

In accordance with the illustrated preferred embodiment, the present invention provides an air valve for controlling the supply of air to a venturi jet of a spa or bath. The air valve includes a housing, a cylindrical barrel, means for sealing between the housing and the barrel, and means for rotating the barrel. The housing has an interior chamber extending between an open, cylindrical bore at one end and a pipe coupling at the other end. The housing is adapted for mounting on the inside wall of the spa, with the open end of the bore facing the inside of the spa and the pipe coupling portion of the housing extending through the side wall and positioned outside the spa. The cylindrical barrel is insertable into and rotatably mounted within the cylindrical bore of the housing. The barrel has an interior cavity that is sealed at its exterior end and is open to the interior chamber of the housing at its interior end.

The housing and barrel each include ports that, when overlapping, provide a path for air to flow from a point exterior of the housing, through the overlapping ports, through the interior cavity of the barrel and interior chamber of the housing to the pipe coupling. Rotating the barrel to a position where the ports do not overlap blocks the air flow path. The sealing means prevents air from flowing into the interior cavity of the housing except when the housing and barrel ports overlap.

Various additional features are present in the preferred embodiment of the air valve of the present invention. One such feature is a one-way valve that allows the flow of air through the valve and toward the venturi jet, but blocks the flow of water in the opposite direction. The cylindrical barrel is preferably composed of two mating pieces for ease of fabrication and installation. The sealing between the barrel and housing is preferably provided by O-rings seals, which are low in cost and easy to replace. The ports preferably are round in shape and include a bleed slot that allows for better control of the air flow at low flow rates.

One significant advantage of the air valve of the present invention as compared to prior art air valves is that the air valve is serviceable from the inside of the spa without dismounting the housing. The air valve is disassembled by removing the barrel, which is accessible from the inside of the spa, and once disassembled, the O-rings can be easily replaced to fix air leaks, or a portion of the barrel can be replaced to fix a broken stem.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter. In particular, the use of the term spa is meant to include and encompass all equivalent terms for an open tank of water such as bath, swimming pool, tub, and hot tub, using air induction jets.

BRIEF DESCRIPTION OF THE DRAWINGS

FIG. 3 is a top plan view, partially in section, of the air valve of the present invention, as taken along section line 3—3 of FIG. 1.

FIG. 4 is a side sectional view of the air valve of the present invention, as taken along section line 4—4 of FIG. 3.

FIG. 5 is a plan detail view, partially in section, of the air valve of the present invention.

DETAILED DESCRIPTION OF THE PREFERRED EMBODIMENT

FIGS. 1 through 5 of the drawings depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
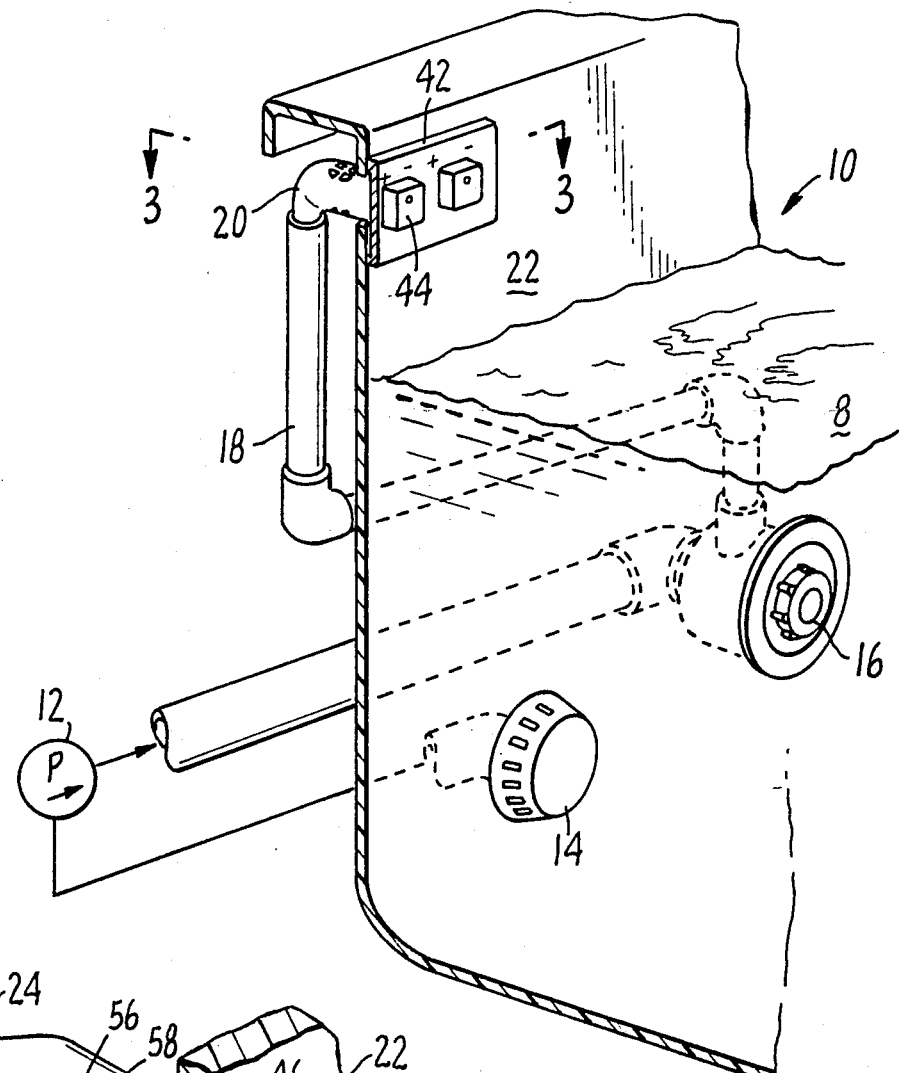
FIG. 1 is a perspective view of a section of a water-filled spa illustrating the installation of an air valve according to the present invention.

The present invention is an air valve for use in controlling the supply of air to a venturi jet of a water-filled spa or bath. As shown in FIG. 1, water 8 is recirculated through the spa or bath 10 by a pump 12, which draws water from the spa through a drain 14 and returns the water to the spa through a jet 16. The jet 16 is constructed with a venturi, so that water passing through the venturi creates a partial vacuum at the venturi. An air supply pipe 18 is connected at one end to the venturi of the jet 16 and is connected at the other end to an air valve 20. When the air valve 20 is open and water is flowing through the jet 16, air is drawn through the air valve, down the air supply pipe 18, and into the venturi of the jet, where the air mixes with water and exits into the spa 10. When the air valve 20 is closed, no air is introduced into the venturi of the jet 16, so that only water is pumped into the spa 10. Of course, when the pump 12 is off, neither water nor air is pumped into the spa. The jet 16 and air valve 20 are shown mounted on the side wall 22 of the spa, although they need not be mounted on the same wall, or even mounted on vertical surfaces. The jet 16 is mounted below and the air valve 20 is mounted above the surface of the water 8 in the spa.

Figure 2:
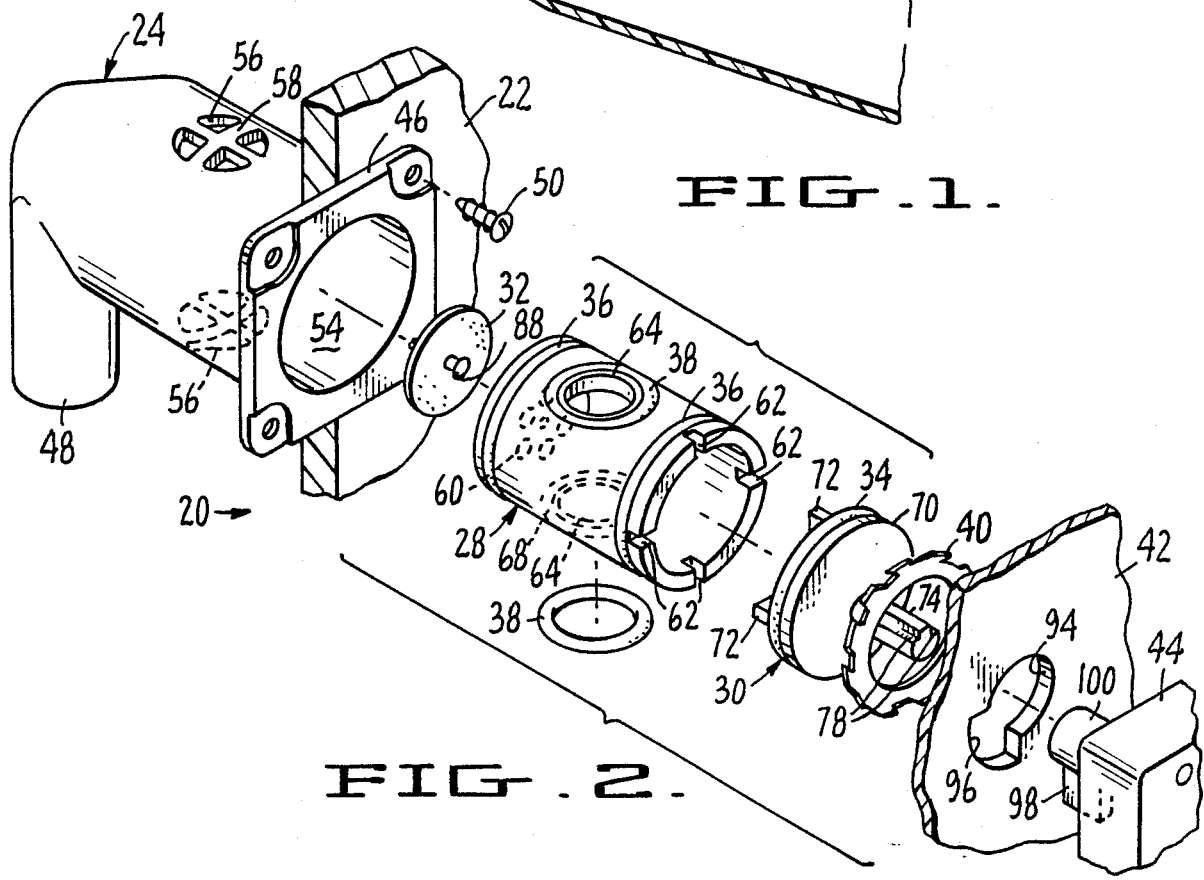
FIG. 2 is an exploded perspective view of the air valve of the present invention.

The air valve 20 and its component parts are illustrated in more detail in FIGS. 2-4. Valve 20 includes a housing 24, a barrel 26 that has a cup portion 28 and a cap portion 30, an umbrella valve 32, O-rings 34, 36, and 38, retaining ring 40, mounting panel 42, and knob 44.

The housing 24 is generally "L" shaped, with a mounting flange 46 at one end and a pipe fitting 48 at the other end. The mounting flange 46 allows the housing to be mounted with fasteners 50 to the inside of side wall 22, with the bulk of the housing, including the pipe fitting 48, extending through a clearance hole 52 in the side wall to the outside of the spa. Housing 24 is basically a shell, with an interior chamber 54 extending from one end nearest the flange 46 to another end at the pipe fitting 48. The portion of the chamber 54 at the flange end is an open cylindrical bore that is slightly larger in inside diameter than the outside diameter of the barrel 26. When the housing 24 is mounted to the spa, the cylindrical bore of the interior chamber 54 is open to the inside of the spa, as shown in FIG. 2. Extending through the wall of the housing 24 in the vicinity of the cylindrical bore are two ports 56, each of which is generally circular in shape, but including a cross-piece 58 that divides each port into four segments. One of the ports 56, as shown in FIG. 5, includes a peripheral slot 57 that extends circumferentially from the periphery of the port 56. Preferably, the flange 46 and pipe fitting 48 both extend at right angles to the axis of the cylindrical bore of the housing so that the housing can be mounted on a vertical wall 22 and the pipe fitting can be coupled to either a vertical or a horizontal air supply pipe 18. Alternatively, the housing can be mounted on a horizontal wall and oriented so that the pipe fitting can be coupled to a horizontal extension of the air supply pipe.

As indicated above, the barrel 26 is composed of two parts, cup 28 and cap 30. Barrel 26 has a generally cylindrical shape with an outside diameter slightly less than the inside diameter of the cylindrical bore of the housing 24. The cup 28 is a hollow cylinder, having a perforated plate 60 at an interior end thereof. The opposite, or exterior, end of the cup 28 is open and has four axially-extending notches 62 that are equally-spaced around the rim of the cup. Two ports 64 are located diametrically opposite each other on the cylindrical portion of the cup 28. Two circumferential grooves 66 are provided in the outer cylindrical surface of the cup 28 at the ends thereof for retaining the circumferential O-rings 36. The outer surface of the cup 28 also includes two grooves 68 that encircle the two ports 64 for retaining the O-rings 38.

The cap portion 30 of the barrel 26 has a disc-shaped portion 70, four tabs 72 extending axially inward from the disc, and a stem 74 extending axially outward from the other side of the disc. The tabs 72 are located equally-spaced around the periphery of the disc 70 and are designed to mate with the notches 62 in the cup 28. Preferably, the four tabs 72 are the radially-outward ends of two crossbars 76 (FIG. 4), which extend across the diameter of the inward face of the disc 70 and cross at right angles. The stem 74 extends outwardly from the center of the disc 70, and has an axially-extending key slot 78 for rotationally locking the stem to the knob 44.

As best shown in FIG. 4, the disk 70 has a diameter equal to that of the cup 28, and includes a circumferential groove 80, for the O-ring 34, located at the interior corner of the rim of the disc.

When the cup 28 and cap 30 are fitted together to form the barrel 26, the tabs 72 at the interior end of the cap engage the notches 62 at the exterior end of the cup so that the knob 44 can rotate both the cup and cap together. The notches 62 and tabs 72 are spaced at right angles around the circumference of the barrel so that the housing 24 and cup 26 can be independently positioned at increments of ninety degrees with respect to the cap 30 and knob 44. This allows the pipe coupling 48 to be either vertical, as shown in FIG. 1, or horizontal without effecting the rotational placement of the control knob 44.

The barrel 26 is assembled and installed in the housing 24 by mating the cup 28 and cap 30, inserting the cup and cap into the open cylindrical bore of the housing until the interior end of the cup touches a retaining tab 82 that protrudes from the interior wall of the housing chamber, and installing the retaining ring 40 into the exterior end of the bore, thus retaining the barrel assembly between the tab 82 and the ring 40.

The valve 20 is shown in FIGS. 3 and 4 with the ports 56 and 64 overlapping. When the ports overlap and the pump 12 is on, a partial vacuum is created at the venturi of the jet 14, which induces a flow of air from a point exterior to the housing 24, through port 56 and port 64, into the interior cavity 84 of the barrel, through the perforations in the plate 60, past the periphery of the umbrella valve 32, into the interior chamber 54 of the housing, and down the pipe coupling 48 to the jet. Arrows 86 illustrate this air flow in FIG. 4. When the ports do not overlap, no air flows to the venturi because the O-rings 34, 36, and 38 effectively seal the interior of the housing from the exterior thereof. Each O-ring is designed to seal between a portion of the barrel 26 and the inside wall of the cylindrical bore of the housing.

Also shown in FIG. 4 is the umbrella valve 32, which serves as a one-way valve that allows air to flow through the valve 20 toward the jet, while preventing water from flowing in the opposite direction. The umbrella valve 32 is composed of a resilient material such as rubber, and is installed on the outside of the interior end of the barrel 26 by inserting a nipple 88 into a hole 90 in the center of the perforated plate 60. The umbrella valve has a circular portion 89 that extends radially past the perforations 92 in the plate 60. A neck portion 91 of the umbrella valve 32 connects the nipple 88 to the circular portion 89. The neck 91 has a diameter that is smaller than the diameter of the hole 90 and is elongated so that the valve can shift sideways with respect to the cup 28.

The shape and position of the umbrella valve 32 is influenced by the magnitude and direction of fluid flow. The circular portion 89 of the umbrella valve has a domed shape that in static or low flow conditions is curved toward the cup 28, as shown in FIG. 5. When air flowing through the valve and toward the jet has a sufficient magnitude, the air pressure will cause the circular portion 89 to curve away from the cup and will shift the umbrella valve sideways away from the surface of the perforated plate so that air freely flows in that direction, as shown in FIG. 4. When a small amount of air flows in the reverse direction, caused by a partial blocking of the exit of the jet 14, the air flows around the relaxed dome of the umbrella valve and into the interior cavity 84 of the barrel. A significant amount of air or water flowing in the reverse direction causes the umbrella valve 32 to shift back against the perforated plate 60, thus sealing off the perforations 92 in the perforated plate and preventing water from entering the interior cavity 84.

The rotational movement of the barrel 26 is restricted to about ninety degrees by the mounting panel 42 and the knob 44. The mounting panel 42 is mounted to the spa after the housing 24 is attached to the spa and the barrel 26 is inserted into the housing. The stem 74 of the barrel 26 protrudes through a hole 94 in the panel 42 (see FIG. 2), and the knob 44 is inserted onto the stem. The hole 94 has a cutout 96 that provides clearance for a radially-extending tab 98 attached to the base 100 of the knob 44. The hole 94 and its cutout 96 allows about ninety degrees of rotational movement of the knob 44. Since the knob 44 is joined to the stem 74 of the barrel 26, the barrel can also be rotated through about ninety degrees. The position of the cutout 96 and the sizes of the ports are selected so that the ports 56 and 64 are aligned at one extreme of the rotational movement of the barrel 26 and the ports do not overlap at the other extreme. This restricted movement of the barrel forces the operator to approach the open position of the valve from the same direction each time and insures that any labeling on the panel will be accurate.

The amount of air flowing through the air valve 20 depends on the amount of overlap between the ports 56 and 64, which in turn depends on the rotational position of the barrel 26 with respect to the housing 24. When the barrel 26 is positioned at one extreme of its movement where the ports do not overlap, no air flows through the valve 20. As the barrel 26 is rotated from the closed position, where the ports do not overlap, toward the open position, where the ports are aligned, the first overlap between the ports occurs when the peripheral slot 57 overlaps a portion of the barrel port 64, as shown in FIG. 5. The slot 57 allows for the gradual release of the vacuum pressure as the valve is opened and provides for a more linear response of air flow over the duration of the rotation of the cylindrical barrel.

The housing 24, cup 28, cap 30 are all preferably molded from ABS plastic, while the O-rings 34, 36, and 38 are preferably composed of ethylene propylene rubber.

From the above description, it will be apparent that the invention disclosed herein provides a novel and advantageous air valve for controlling the supply of air to a venturi jet of a spa or bath. The foregoing discussion discloses and describes merely exemplary methods and embodiments of the present invention. As will be understood by those familiar with the art, the invention may be embodied in other specific forms without departing from the spirit or essential characteristics thereof. For example, the barrel 26 could be fabricated in a single piece, rather than two pieces as shown. Accordingly, the disclosure of the present invention is intended to be illustrative, but not limiting, of the scope of the invention, which is set forth in the following claims.

What is claimed is:

1. An air valve for controlling the supply of air to a venturi jet of a spa, wherein the spa includes an air supply pipe that fluidically connects the air valve to the venturi jet, the valve comprising:

a housing adapted for mounting on a side wall of the spa, wherein the housing has an interior chamber extending between first and second ends, wherein a portion of the interior chamber adjacent the first end thereof is an open, cylindrical bore, wherein the housing includes a pipe coupling for fluidically connecting the second end of the interior chamber to the air supply pipe, and wherein the housing includes a housing port extending between the cylindrical bore and the exterior of the housing;

a cylindrical barrel rotatable within the cylindrical bore of the housing, wherein the barrel is adapted for insertion into the cylindrical bore through the open end of the bore, wherein the barrel includes an interior cavity having a first end that is fluidically sealed and is positioned adjacent the open end of the cylindrical bore and a second end that is fluidically open to the interior chamber of the housing, wherein the barrel includes a barrel port extending through the wall of the barrel between the cavity and the exterior of the barrel, and wherein the barrel port is longitudinally positioned such that the barrel and housing ports can overlap;

retaining means for retaining the barrel within the cylindrical bore of the housing, said retaining means including a protrusion within the interior chamber of the housing that limits the maximum insertion of the barrel into the cylindrical bore, and including a retaining ring that engages the inner wall of the cylindrical bore and retains the barrel between the retaining ring and the protrusion;

sealing means for sealing between the cylindrical outer surface of the barrel and the cylindrical bore of the housing to prevent air from flowing between the exterior and interior of the housing except when the housing and barrel ports overlap; and means for rotating the barrel between an open position wherein the housing and barrel ports are aligned and a closed position wherein the housing and barrel ports do not overlap and are fluidically isolated by the sealing means.

2. An air valve as recited in claim 1 wherein the housing has two housing ports located diametrically opposite each other on the circumference of the housing, and wherein the barrel has two barrel ports located diametrically opposite each other on the circumference of the barrel.

3. An air valve as recited in claim 1 wherein the housing includes a mounting flange disposed at the first end of the housing, and wherein the flange is adapted for mounting to a first side of the side wall of the spa with the pipe coupling disposed on the other side of the side wall and the cylindrical bore accessible from the first side of the side wall.

4. An air valve as recited in claim 1 wherein the pipe coupling is disposed at substantially ninety degrees to the axis of the cylindrical bore.

5. An air valve as recited in claim 1 wherein the housing port and the barrel port are generally circular in shape, and wherein the housing port further includes a peripheral slot extending radially from the port along the circumference thereof.

6. An air valve as recited in claim 1 wherein the barrel includes a cup portion, a cap portion, and coupling means for coupling together the cup and cap portions, wherein the cup portion is a hollow cylinder that includes the barrel port and the open second end of the cavity, wherein the cap portion is a disk having an outer diameter substantially equal to that of the cup portion, and wherein the cap portion is positioned adjacent to and concentric with the cup portion when the portions are coupled together.

7. An air valve as recited in claim 6 wherein the coupling means includes one or more axially-extending tabs located on the side of the cap portion that faces the cup portion, and includes one or more corresponding, axially-extending notches located on the rim of the cup portion that faces the cap portion, wherein the tabs engage the notches to couple together the cap and cup portions during rotation of the barrel.

8. An air valve as recited in claim 7 wherein the cap portion includes four tabs uniformly spaced and the cup portion includes four notches uniformly spaced.

9. An air valve as recited in claim 6 wherein the sealing means includes circumferential grooves at both ends of the cylindrical surface of the cup portion and at the rim of the cap portion, and includes O-rings disposed in the grooves and operable for sealing between the barrel and the housing.

10. An air valve as recited in claim 1 wherein the sealing means includes circumferential grooves at both ends of the cylindrical surface of the barrel, includes a groove in the outer cylindrical surface of the barrel and encircling the barrel port, and includes O-rings disposed in the grooves and operable for sealing between the barrel and the housing.

11. An air valve as recited in claim 1 further comprising a one-way valve coupled to the open second end of the barrel and operable for allowing air to flow from the interior cavity of the barrel toward the pipe coupling while preventing water from flowing in the opposite direction, wherein the one-way valve includes one or more air passageways through the second end of the barrel and includes a resilient member disposed outside of the barrel and adjacent to the second end thereof and covering the air passageways against water flow into the interior cavity of the barrel.

12. An air valve as recited in claim 1 wherein the means for rotating the barrel includes a stem that extends axially from the sealed first end of the barrel, and includes a knob coupled to the stem for rotation therewith.

13. An air valve as recited in claim 12 wherein the rotating means includes limiting means for limiting the extent of rotation of the barrel.

14. An air valve as recited in claim 13 wherein the limiting means includes a panel having a hole through which a base portion of the knob extends and a tab that extends radially from the base portion of the knob, and wherein the hole and the tab are configured so that the tab contacts an edge of the hole to limit the rotation of the knob with respect to the panel.

15. An air valve for controlling the supply of air a venturi jet of a spa, wherein the spa includes an air supply pipe that fluidically connects the air valve to the venturi jet, the valve comprising:

a housing having an interior chamber extending between first and second ends, wherein a portion of the interior chamber adjacent the first end thereof is an open, cylindrical bore, wherein the housing includes a pipe coupling disposed at right angles to the axis of the cylindrical bore for fluidically connecting the second end of the interior chamber to the air supply pipe, wherein the housing includes an outer port extending between the cylindrical bore and the exterior of the housing, and wherein the housing includes a mounting flange disposed at the first end of the housing at right angles to the axis of the cylindrical bore and adapted for mounting to a first side of the side wall of the spa with the pipe coupling disposed on the other side of the side wall and the cylindrical bore accessible from the first side of the side wall;

a hollow, cylindrical cup rotatably mounted within the cylindrical bore of the housing, wherein the cup is adapted for insertion into the cylindrical bore through the open end thereof, wherein the cup includes a concentric cavity that is fluidically open at an interior end of the cup to the interior chamber of the housing, wherein the cup includes an inner port extending between the cavity and the exterior of the cup and longitudinally positioned so that the inner and outer ports can overlap, wherein the cup includes circumferential O-ring grooves in the outer surface of the cup at both ends thereof and an O-ring groove in the outer surface of the cup and encircling the inner port, and wherein the cup includes four notches uniformly spaced around the rim of the cup at an exterior end thereof;

a cap adapted for mating with the exterior end of the cup and sealing the exterior end of the cup cavity, wherein the cap includes a disk portion having an outer diameter substantially equal to that of the cup and which is positioned adjacent to and concentric with the cup when the cup and cap are mated together, wherein the cap includes four tabs uniformly spaced around an interior side of the disk and operable for engaging the notches in the cup, and wherein the cap further includes a stem axially-extending from an exterior side of the disk;

a retaining ring coupled to the housing at the open first end thereof and operable for retaining the cap and cup in the cylindrical bore of the housing;

a one-way valve coupled to the open interior end of the cup and operable for allowing air to flow from the interior cavity of the cup toward the pipe coupling while preventing water from flowing in the opposite direction;

O-rings disposed in the O-ring grooves in the cup and operable for sealing between the cup and the cylindrical bore of the housing; and a knob coupled to the stem of the cap for rotating the cap and mated cup between an open position wherein the outer and inner ports are aligned and a closed position wherein the outer and inner ports do not overlap.

* * * * *